(12) United States Patent
De Boer

(10) Patent No.: US 7,167,428 B2
(45) Date of Patent: Jan. 23, 2007

(54) OPTICAL RECORD CARRIER RECORDING DEVICE AND METHOD COMPRISING MEANS FOR GENERATING A TIMING SIGNAL HAVING AN INCREASED TIMING RESOLUTION

(75) Inventor: Bart Michiel De Boer, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 285 days.

(21) Appl. No.: 10/502,523

(22) PCT Filed: Dec. 23, 2002

(86) PCT No.: PCT/IB02/05712

§ 371 (c)(1),
(2), (4) Date: Jul. 26, 2004

(87) PCT Pub. No.: WO03/063159

PCT Pub. Date: Jul. 31, 2003

(65) Prior Publication Data

US 2005/0083807 A1      Apr. 21, 2005

(30) Foreign Application Priority Data

Jan. 25, 2002   (EP)   .................... 02075315

(51) Int. Cl.
*G11B 20/10* (2006.01)
(52) U.S. Cl. .................. 369/47.51; 369/59.11
(58) Field of Classification Search ............... None
See application file for complete search history.

(56) References Cited

U.S. PATENT DOCUMENTS 6,721,255 B1 * 4/2004 Gushima et al. ......... 369/59.12
6,731,586 B1 * 5/2004 Seo et al. .................... 369/116
6,937,542 B1 * 8/2005 Ogawa ..................... 369/44.13

FOREIGN PATENT DOCUMENTS

EP          1143621 A2      10/2001
WO          0039793          7/2000

* cited by examiner

*Primary Examiner*—Paul Huber

(57) ABSTRACT

The invention relates to an optical record carrier recording apparatus and a corresponding method comprising a device for generating a timing signal having an increased timing resolution with respect to an inputted recording signal. In order to achieve such an increased timing resolution without increasing the reference clock frequency using delay cells which have a minimum delay larger that the required timing resolution it is proposed that the device for generating said timing signal comprises: delay means for receiving said recording signal and for generating said timing signal, said delay means comprising a first group of delay cells having a first delay and a second group of delay cells having a second delay, the difference between said first and said second delay forming a unit delay being smaller than said first and said second delay, and selection means for selecting the number of unit delays for delaying the recording signal by controlling the number of delay cells of said first and said second group to be passed by said recording signal.

10 Claims, 5 Drawing Sheets

Figure 1:
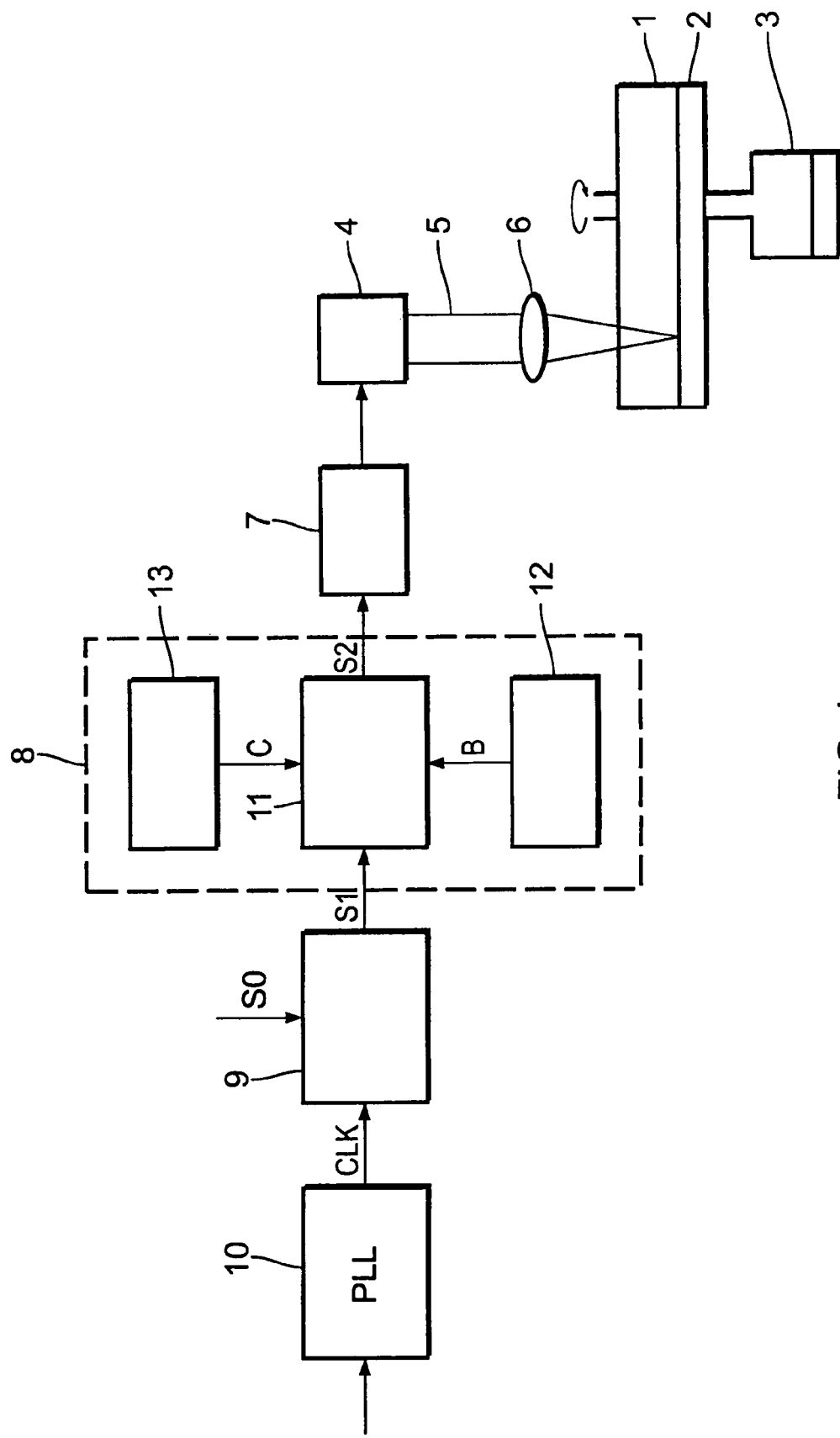

OPTICAL RECORD CARRIER RECORDING DEVICE AND METHOD COMPRISING MEANS FOR GENERATING A TIMING SIGNAL HAVING AN INCREASED TIMING RESOLUTION

This application is a 371 of PCT/IB02/05712, filed Dec. 23, 2002.

The invention relates to an optical record carrier recording apparatus and a corresponding method for recording data by irradiating a radiation beam onto a recording surface of an optical record carrier comprising:

a radiation source for providing the radiation beam, a phase locked loop for providing a clock signal, a recording signal generation unit for generating a recording signal from a received information signal using said clock signal, a device for generating a timing signal from said recording signal, said timing signal having an increased timing resolution with respect to said recording signal, and a driver unit for receiving said timing signal and driving said radiation source.

Writing on an optical disc, e.g. CD-R/RW, DVD+RW or DVR, is done by heating the disc with a focused laser beam. The heating of the disc causes permanent or semi-permanent changes in the disc material that can be detected during read out. During writing a laser driver IC, also called LADIC, drives a laser with a predetermined pattern of current pulses of different amplitude and duration, i.e. the write strategy, according to the data that has to be written on the disc. Such an optical recording/reproducing device is e.g. known from WO 00/39793.

Ever increasing writing speeds and newly developed write strategies for optical recording require the timing resolution of the individual laser pulses to be higher than a period of the laser drivers PLL, i.e. the Phase Locked Loop, clock. That is, the laser driver should be able to start a new laser pulse not only on PLL clock edges, but on predefined moments between two PLL clock edges as well. This means a super-resolution has to be applied to the laser driver's PLL clock. This can be done by means of a tapped delayline in which a timing signal, indicating the start of the next laser pulse, is delayed for a predefined fraction of the clock period. This can be achieved by inserting a certain number of delay cells in the timing signal path, each delaying the signal for a fraction. The number of delay cells inserted can be selected, thereby defining the total delay the signal undergoes. However, at high clock frequencies and when a high super-resolution is required, the minimum delay achievable with standard delay cells is larger than the desired unit delay.

It is therefore an object of the present invention to provide an optical record carrier recording device and method with means for generating a timing signal having an increased timing resolution with respect to an input signal using delay cells that do not necessarily have a minimum delay shorter than the required timing resolution and without increasing the timing resolution of said input signal.

This object is achieved by an apparatus as claimed in claim 1 comprising: delay means for receiving said recording signal and for generating said timing signal, said delay means comprising a first group of delay cells having a first delay and a second group of delay cells having a second delay, the difference between said first and said second delay forming a unit delay being smaller than said first and said second delay, and selection means for selecting the number of unit delays for delaying the recording signal by controlling the number of delay cells of said first and said second group to be passed by said recording signal.

The invention is based on the idea not to use the delay in the delay cells itself as a unit delay, but rather the difference between two delay cells having different delays, preferably having only slightly different delays. Said difference is selected such that it is smaller than a delay of delay cells of both the first and the second group. Since the difference of the delays is used as a unit delay, the delay of the individual delay cells does not need to be very short which makes them easier to design and thus cheaper in price. On the other hand much higher superresolutions can be made than the minimum delay achievable with delay cells itself. For control of the exact delay the recording signal undergoes selection means are provided for selecting the number of delay cells of the first and second group thus controlling the signal path of the recording signal through said groups of delay cells.

Preferred embodiments of the invention are included in the dependent claims. According to a first preferred embodiment controlled delay cells are used and delay control means are provided for controlling said first and second delay of the delay cells of said first and second group. Preferably, the delay of said delay cells is controlled such that all delay cells of the first group have the same delay and all delay cells of the second group have the same delay. A preferred choice for the delay of said delay cells is defined in dependent claim 3.

Assuming that x (x−1), x being an integer number, is the number of subdivisions to be made of the timing resolution of said recording signal, a minimum of 2x−3 delay cells is required in the first group and a minimum of x−2 delay cells is required in the second group. The first and second numbers of delay cells of said first and second group which have to be passed by the recording signal in order to delay it by a certain number N of unit delays D can then generally be calculated. The second number $Z_2$ of delay cells of said second group is generally given as $Z_2 = N \mod(x-1)$ and the first number $Z_1$ of delay cells of said first group is generally given as $Z_1 = \text{int}(N/(x-1)) - Z_2 + (x-2)$. This means that the signal passing x−2 delay cells of the first group and zero delay cells of the second group is defined to be a signal having zero delay. All other unit delays are defined relative to said signal having zero delay.

An advantageous embodiment of said selection means is defined in claim 6 according to which to each group of delay cells a number of AND gates and an OR gate are assigned for selection of the signal path.

According to another aspect of the invention said delay cells are non-inverting delay cells, each comprising two inverting current controlled or voltage controlled delay cell units. However, other configurations may also be used. An outcoupling circuit may be used to regenerate the output signals from the delay cells.

Preferred embodiments of the delay control means are defined in claims 8 and 9. Preferably said delay control means comprise two phase locked loop circuits, each comprising a current controlled oscillator for generating a first and second control signal for controlling the delay of the delay cells of said first and second group and a clock divider for dividing the frequency of the output signal of said current controlled oscillator. Both PLL circuits preferably comprise a phase detector and a loop filter, and both PLL circuits are interconnected by third clock divider. Each of said current controlled oscillators is preferably formed as a ring oscillator by a number of interconnected inverting delay cells. The delay of the delay cells of said first ring oscillator is preferably selected to be p times the first delay of the delay cells of the first group, while the delay of the delay cells of the second ring oscillator is selected to be p times said second delay of the delay cells of said second group wherein p is a number greater than zero, e.g. 0.5. Depending on the type of delay cells used according to the invention in the delay means the current through or the voltage across the first or the second current controlled oscillator is copied to the delay cells of the first or the second group in the delay means.

A corresponding methods to the device of claim 1 is defined in claim 10. In general, the invention is applicable in any PLL based timing signal generating circuit, e.g. pattern synthesizers, where a very high timing resolution is required that scales with an incoming clock signal. Further, the invention may be applied in adaptive clock phase shifters or adaptive (clock) deskewing circuits as for example used in microprocessors or memories to compensate for (interchip) clock skew.

Figure 2:
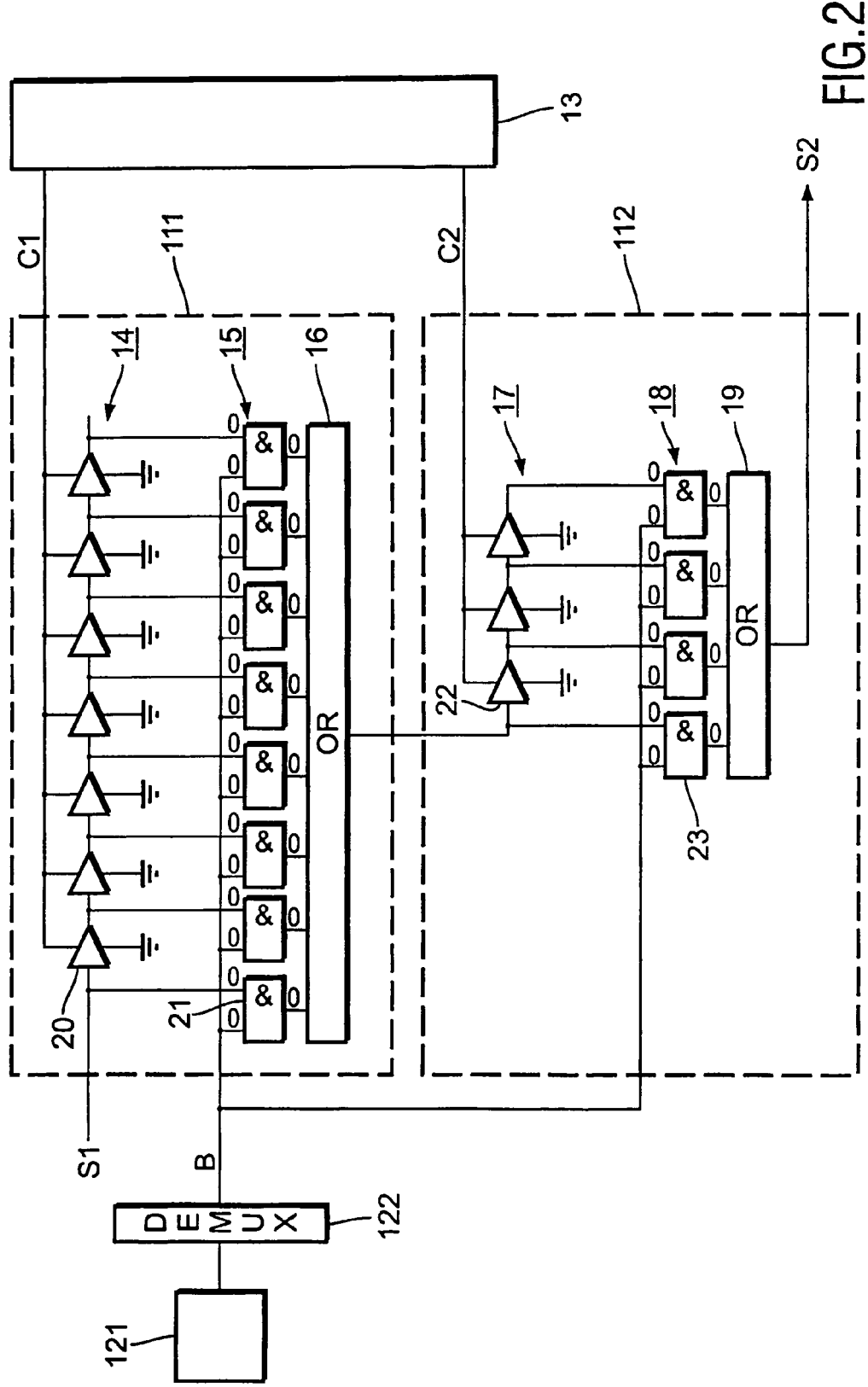
Figure 3A:
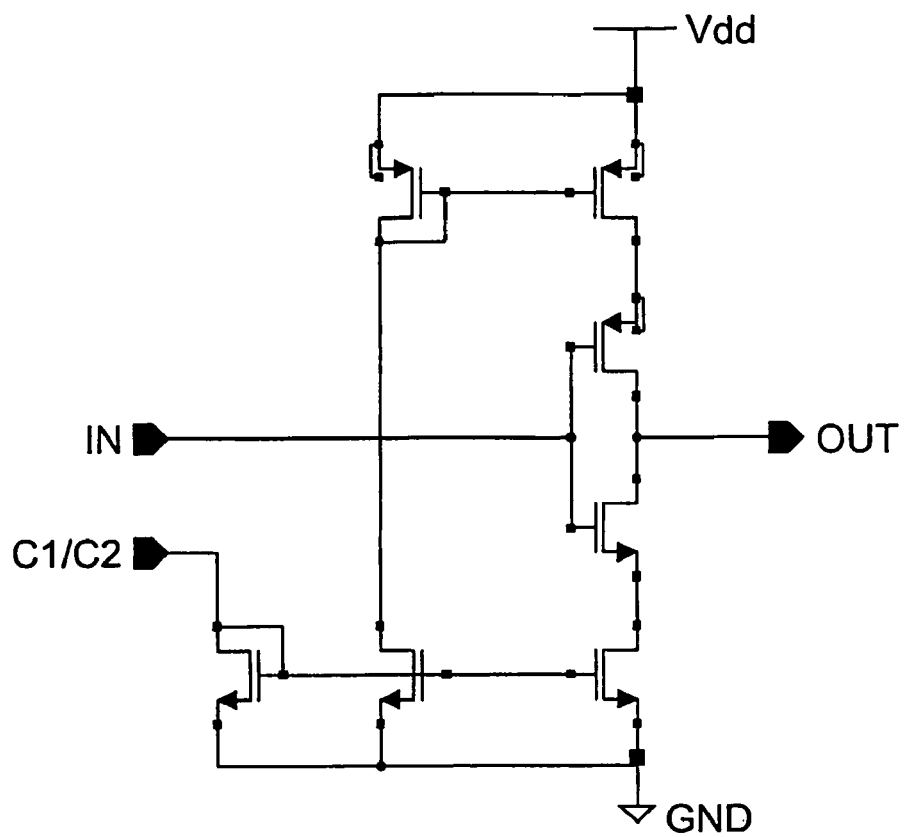
Figure 4:
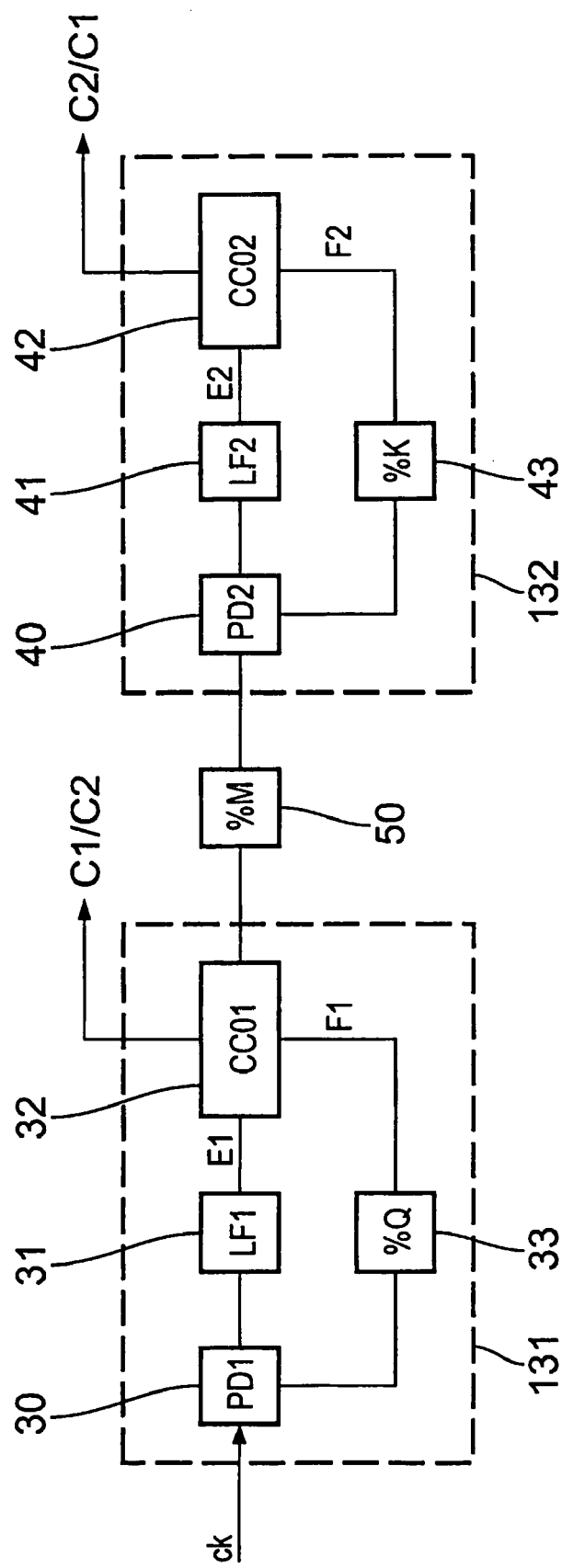
Figure 5:
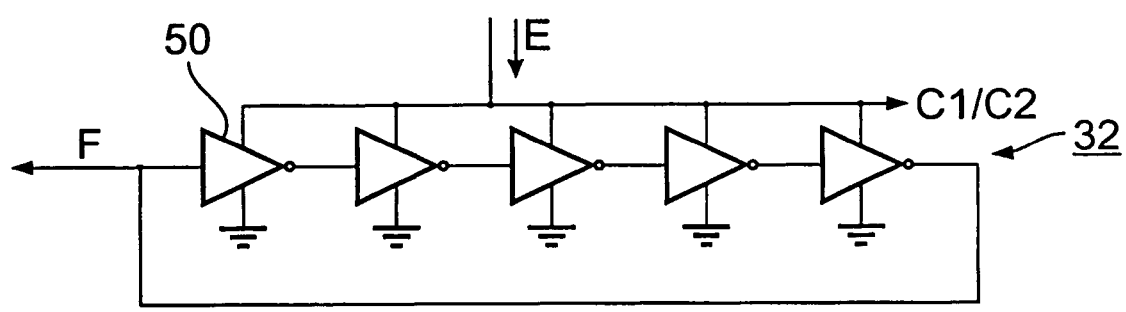

The invention will now be explained in more detail with reference to the drawings, in which:

FIG. 1 shows a block diagram of an optical record carrier recording apparatus according to the present invention, FIG. 2 a device for generating a timing signal having an increased timing resolution according to the present invention, FIG. 3a, b show different embodiments of delay cells, FIG. 4 shows a block diagram of delay control means, and FIG. 5 shows a ring oscillator used in said delay control means.

FIG. 1 shows a block diagram of an optical record carrier recording apparatus according to the present invention. Said apparatus comprises as radiation source a laser 4 for recording a data signal onto the recording surface 2 of a disc-shaped optical record carrier 1. Said signal is written by irradiating a radiation beam 5 emitted by said laser 4 and focused onto the recording surface 2 by a lens 6 thus heating the disc locally to cause permanent or semi-permanent changes in the disc material on the recording surface 2. During recording the optical record carrier 1 is rotated around its center by a motor 3 and the laser 4 is driven by a laser driver unit 7 with a predetermined pattern of current pulses of different amplitude and duration giving the desired write strategy. Said driver unit 7 is provided with the required timing signal S2 from a timing signal generation device 8 according to the invention which receives an recording signal S1 and generates the timing signal S2 therefrom having a higher timing resolution than said input signal S1, which is also called recording signal. Said input signal S1 is generated by a recording signal generation unit 9 from the data signal S0 containing the data to be recorded and based on a reference clock signal CLK which is generated by a Phase Locked Loop (PLL) 10.

To implement a write strategy requiring an increased writing speed or writing accuracy the timing resolution of the individual laser pulses of the laser 4 must be higher than the period of the PLL's reference clock signal CLK and of the input signal S1. This is achieved according to the present invention by delay means 11 comprising a number of delay cells of a first and of a second group, the delay cells of the first group having slightly different delay as the delay cells of the second group. Thus, the difference between the delay of one cell of the first group and one cell of the second group will be used as a unit delay since the difference of the delays can thus be made much smaller than the delay of the individual delay cells. In this way a much higher super-resolution can be achieved than the minimum delay achievable with individual delay cells.

For control of the delay of individual delay cells delay control means 13 providing a control signal C are provided. For selecting the signal path the input signal S1 shall follow through said delay means 11 thus controlling the actual delay of said input signal S1 selection means 12 generating a selection signal B are provided.

The timing signal generation device according to the present invention is shown in more detail in FIG. 2. The delay means comprise a first delay unit 111 and a second delay unit 112 each comprising a number of delay cells 20, 22, a number of AND gates 21, 23 and an OR gate 16, 19. In the present embodiment the first delay unit 111 comprises a first delayline 14 of a first group of seven in series interconnected delay cells 20. The input signal S1 comprising timing information used during recording and having a low timing resolution is inputted into the first delay cell of said delayline 14. The delay of said delay cells 20 is controlled by a first control signal C1 generated by the delay control means 13. The input of each delay cell 20 and the output of the last delay cell are connected to the input of separate AND gates 21 of a first group 15. The other input of said AND gates 21 is connected to the selection means comprising a selection unit 121 and a demultiplexer 122 for generating a selection signal B for selection of the signal path the input signal S1 shall follow through the delay means. Each AND gate 21 thus functions as a switch which can individually be switched on or off to let the signal pass or not.

The outputs of said AND gates 21 of the first group 15 are all connected to an OR gate 16 the output of which is connected to the input of the first delay cell 22 of a number of delay cells of the delayline 17 included in the second delay unit 112. In the present embodiment said delayline 17 comprises three in series interconnected delay cells 22 the delay of which is controlled by a second control signal C2 provided from said delay control means 13. All inputs of said delay cells 22 and the output of the last delay cell are individually connected to an input of an AND gate 23 of a second group 18, the second input of which is also provided with the selection signal B for selecting the signal path. The outputs of said AND gates 23 are connected to an OR gate 19 outputting the timing signal S2 having an increased timing resolution with respect to the input signal S1. To select the signal path the selection signal is a four bits code in the present embodiment.

Figure 3B:
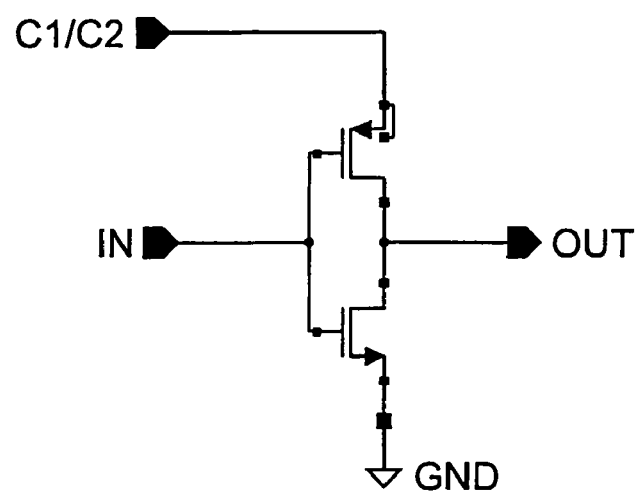

Preferably, each of the delay cells 20, 22 consists of two inverting delay cells, resulting in non-inverting delay cells. These may be either current controlled delay cells as shown in FIG. 3a or voltage controlled delay cells as shown in FIG. 3b, while also other configurations are possible. The use of two of such inverting delay cells as one delay cell in the delaylines 14 and 17 results in non-inverting delay cells with a twice as large delay as the single inverting delay cells.

The delay cells 20, 22 are controlled by the control means 13 in such a way that the delay per cell in the first delayline 14 is $T/x$ and the delay per cell in the second delayline 17 is $T/(x-1)$. Therein, T is the clock period of the reference clock. i.e. of the PLL clock signal CLK and of the input signal S1 (which in general need not be periodic; it is a timing signal with a resolution of T) on which the super-resolution has to be applied, and $x(x-1)$ is the number of subdivisions that is made in one period T. The following table gives the delay per cell for both delay units as well as the number of subdivisions per period T for different values of x. In the embodiment shown in FIG. 2 the value of x is 5, resulting in a subdivision of the clock period T of 20.

| X | Delay unit111 | Delay unit 112 | Subdivisions per T | Resolution gain |
|---|---|---|---|---|
| 5 | T/5 | T/4 | 20 | 4x |
| 6 | T/6 | T/5 | 30 | 5x |
| 7 | T/7 | T/6 | 42 | 6x |
| 8 | T/8 | T/7 | 56 | 7x |
| 9 | T/9 | T/8 | 72 | 8x |
| 10 | T/10 | T/9 | 90 | 9x |

The resolution gain is the timing resolution achieved by the delay means according to the present invention divided by the timing resolution achievable with a conventional delayline with the same minimum delay per delay cell.

Considering the delay means shown in FIG. 2 in which x is 5 resulting in a subdivision of 20. The delay of a signal that passes the first three delay cells 20 of the first delayline 14 and no delay cells 22 of the second delayline 17 is defined as zero. If now a delay of a certain amount, e.g. T/20, shall be achieved the signal path is controlled such that the signal passes, for the example of T/20, two delay cells of the first delayline 14 and one delay cell of the second delayline 17, effectively subtracting T/5 from zero and then adding T/4. Similarly, if a delay of e.g. 7T/20 is desired, a delay of 2T/5 is subtracted from zero and thereafter a delay of 3T/4 is added by letting the signal pass only the first delay cell of the first delayline 14 and then three delay cells of the second delayline 17. In other words, the signal that has an absolute delay of 3 T/5 is defined as having a delay being zero, and all other delays are calculated relative to the signal with zero delay. Since the signal with zero delay is defined to pass three delay cells of the first delayline it is either possible to subtract or add delays relative to said signal in the first delay unit 111.

The following table shows the delayline settings per desired delay for x=5:

| Delay | # N of unit delays | # delay cells passed unit 111 | # delay cells passed unit 112 |
|---|---|---|---|
| 0 | 0 | 3 | 0 |
| T/20 | 1 | 2 | 1 |
| 2T/20 | 2 | 1 | 2 |
| 3T/20 | 3 | 0 | 3 |
| 4T/20 | 4 | 4 | 0 |
| 5T/20 | 5 | 3 | 1 |
| 6T/20 | 6 | 2 | 2 |
| 7T/20 | 7 | 1 | 3 |
| 8T/20 | 8 | 5 | 0 |
| 9T/20 | 9 | 4 | 1 |
| 10T/20 | 10 | 3 | 2 |
| 11T/20 | 11 | 2 | 3 |
| 12T/20 | 12 | 6 | 0 |
| 13T/20 | 13 | 5 | 1 |
| 14T/20 | 14 | 4 | 2 |
| 15T/20 | 15 | 3 | 3 |
| 16T/20 | 16 | 7 | 0 |
| 17T/20 | 17 | 6 | 1 |
| 18T/20 | 18 | 5 | 2 |
| 19T/20 | 19 | 4 | 3 |

Similar tables can be made for other values of x by calculating the following if a predetermined number N of unit delays D is desired:

The first number $Z_1$ of delay cells of the first delay unit 111 equals int(N/(x−1))−$Z_2$+(x−2), wherein the second number $Z_2$ of delay cells passed in the second delay unit 112 equals N mod (x−1).

The total number of delay cells to be present in both delay units 111, 112 for the delaylines 14, 17 for a certain value of x is 2x−3 for the first delayline 14 and x−2 for the second delayline 17.

The two control signals C1 and C2 for controlling the delay of the delay cells 20, 22 can be generated with delay control means as shown in FIG. 4 comprising two PLL circuits 131, 132. Each of said PLL circuits 131, 132 comprises a phase detector (PD1, PD2) 30, 40, a loop filter (LF1, LF2) 31, 41, a current controlled oscillator (CC01, CC02) 32, 42 and a clock divider (% N, % K) 33, 43. The first PLL circuit 131 is provided with a clock signal ck; both PLL circuits 131, 132 are interconnected by a third clock divider (% M) 50. The clock dividers 33, 43 divide the frequency of the clock signal F1, F2 from the oscillators 32, 42 which are fed back to the phase detectors 30, 40 to be compared with the incoming clock signal. The current controlled oscillators 32, 42 preferably consist of five interconnected inverting delay cells 50, which are identical to the inverting delay cells used twice in the delay cells of delaylines 14 and 17 (see FIG. 2), resulting in a ring oscillator as shown in FIG. 5. Said ring oscillator receives as input signal E1, E2 the output signal from the loop filter and outputs the ring signal F1, F2 as well as the control signal C1 or C2, respectively.

In many laser driver units of optical record recording apparatuses the first PLL circuit 131 is already present, e.g. being the PLL 10 shown in FIG. 1. The frequency of the first current controlled oscillator 32 is Q times the frequency of the incoming clock. If it is assumed that the period of said clock signal is T, then the delay in the individual delay cells of the ring oscillator as shown in FIG. 5 is T/10. If the current through or the voltage across the current controlled oscillator—depending on the type of delay cells used—is copied to the delay cells in the first delayline 14 they will each have a delay of T/5 since the non-inverting delay cells therein consist of two of the inverting delay cells as used in the current controlled oscillator.

The frequency of the second current controlled oscillator 42 is K/M times the frequency of the first current controlled oscillator 32, resulting in a delay of T/10 times M/K per delay cell in the second current controlled oscillator 42. Using as an example K=4 and M=5 results in a delay of T/8 per delay cell. Copying the voltage across or the current through the second current controlled oscillator 42 to the delay cells of the second delayline 17 results in a delay of T/4 per delay cell in the second delay unit 112.

In the following table the number of inverting delay cells per current controlled oscillator is shown as well as the values of M and K for different values of x. Also the way the control signals should be copied to both delay units is shown.

| X | # delay cells per CCO | M | K | CCO1 to | CCO2 to |
|---|---|---|---|---|---|
| 5 | 5 | 5 | 4 | Unit 111 | Unit 112 |
| 6 | 5 | 5 | 6 | Unit 112 | Unit 111 |
| 7 | 7 | 7 | 6 | Unit 111 | Unit 112 |
| 8 | 7 | 7 | 8 | Unit 112 | Unit 111 |
| 9 | 9 | 9 | 8 | Unit 111 | Unit 112 |
| 10 | 9 | 9 | 10 | Unit 112 | Unit 111 |

The invention claimed is:

1. An optical record carrier recording apparatus for recording data by irradiating a radiation beam (5) onto a recording surface (2) of an optical record carrier (1) comprising:
   a radiation source (4) for providing the radiation beam (5),
   a phase locked loop (10) for providing a clock signal (clk),
   a recording signal generation unit (9) for generating a recording signal (S1) from a received information signal (S) using said clock signal (clk),
   a device (8) for generating a timing signal (S2) from said recording signal (S1), said timing signal (S2) having an increased timing resolution with respect to said recording signal (S1), and
   a driver unit (7) for receiving said timing signal (S2) and driving said radiation source (4),
   wherein said device (8) for generating said recording signal (S1) comprises:
   delay means (11) for receiving said recording signal (S1) and for generating said timing signal (S2), said delay means comprising a first group (14) of delay cells (20) having a first delay and a second group (17) of delay cells (22) having a second delay, the difference between said first and said second delay forming a unit delay being smaller than said first and said second delay, and
   selection means (12) for selecting the number of unit delays for delaying the recording signal (S1) by controlling the number of delay cells (20, 22) of said first and said second group (14, 17) to be passed by said recording signal (S1).

2. The apparatus as claimed in claim 1, further comprising delay control means (13) for controlling said first and said second delay of the delay cells (20, 22) of said first and said second group (14, 17).

3. The apparatus as claimed in claim 2, wherein said delay control means (13) are adapted for controlling the delay of the delay cells of the first group (14) to be T/x, T being the timing resolution of said recording signal (S1) and x being an integer number, and for controlling the delay of the delay cells of the second group (17) to be T/(x−1) resulting in a unit delay of T/((x−1)x).

4. The apparatus as claimed in claim 1, wherein said first group (14) comprises x−2 delay cells (20) and said second group (17) comprises 2x−3 delay cells (22), x being an integer number and x(x−1) being the number of subdivisions to be made of the timing resolution of said recording signal.

5. The apparatus as claimed in claim 4, wherein said selection means (12) are adapted for controlling the number of delay cells (20, 22) of said first and said second group (14, 17) to be passed by said recording signal (S1) such that for a selected delay number N of unit delays D a second number $Z_2$ of delay cells of said second group (17) is selected to be N mod (x−1), and a first number $Z_1$ of delay cells of said first group (14) is selected to be int(N/(x−1))−$Z_2$+(x−2).

6. The apparatus as claimed in claim 1, wherein said selection means (12) comprise a first group (15) and a second group (18) of AND gates (21, 23), and a first and a second OR gate (16, 19), said first OR gate (16) being connected to the outputs of the AND gates (21) of said first group (15) and said second OR gate (19) being connected to the outputs of the AND gates (23) of said second group (18), the output of said first OR gate (16) being connected to the recording of the first AND gate (23) of said second group (18),
   said AND gates (21, 23) being controlled for switching the recording signal (S1) to said first OR gate (16) after passing a first number $Z_1$ of delay cells (20) of said first group (14) and for switching the recording signal (S1) to said second OR gate (19) after passing a second number $Z_2$ of delay cells (22) of said second group (17).

7. The apparatus as claimed in claim 1, wherein said delay cells (20, 22) are non-inverting delay cells, each comprising two inverting current controlled or voltage controlled delay cell units.

8. The apparatus as claimed in claim 2, wherein said delay control means (13) comprise two phase locked loop circuits (131, 132), each phase locked loop circuit comprising a current controlled oscillator (32, 42) for generating a first and second control signal (C1, C2) for controlling the delay of the delay cells (20, 22) of said first and second group (14, 17) and a clock divider (33, 43) for dividing the frequency of the output signal (F) of said current controlled oscillator (32, 42).

9. The apparatus as claimed in claim 8, wherein said current controlled oscillators (32, 42) each comprise a number of interconnected inverting delay cells (50) forming a ring oscillator, wherein the delay of said delay cells of a first ring oscillator (32) is selected to be p times said first delay and the delay of said delay cells of the second ring oscillator (42) is selected to be p times said second delay, p being a number greater than zero.

10. An optical record carrier recording method for recording data by irradiating a radiation beam (5) onto a recording surface (2) of an optical record carrier (1) comprising the steps of:
   generating the radiation beam (5) by a radiation source (4),
   generating a clock signal (clk) by a phase locked loop (10),
   generating a recording signal (S1) by a recording signal generation unit (9) from a received information signal (S) using said clock signal (clk),
   generating a timing signal (S2) from said recording signal (S1), said timing signal (S2) having an increased timing resolution with respect to said recording signal (S1), and
   receiving said timing signal (S2) and driving said radiation source (4) by a driver unit (7),
   wherein said recording signal (S1) is received by delay means (11) for generating said timing signal (S2), said delay means (11) comprising a first group (14) of delay cells (20) having a first delay and a second group (17) of delay cells (22) having a second delay, the difference between said first and said second delay forming a unit delay being smaller than said first and said second delay, and
   wherein the number of unit delays for delaying the recording signal (S1) is selected by selection means (12) by controlling the number of delay cells (20, 22) of said first and said second group (14, 17) to be passed by said recording signal (S1).

* * * * *